United States Patent
Suyama

(10) Patent No.: US 7,877,194 B2
(45) Date of Patent: Jan. 25, 2011

(54) DIAGNOSIS METHOD FOR SOLENOID VALVE BASED ON NOISE DETECTION

(75) Inventor: Hironobu Suyama, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 491 days.

(21) Appl. No.: 11/600,842

(22) Filed: Nov. 17, 2006

(65) Prior Publication Data

US 2007/0114481 A1 May 24, 2007

(30) Foreign Application Priority Data

Nov. 18, 2005 (JP) .............................. 2005-334777

(51) Int. Cl.
| | | |
|---|---|---|
| G06F 19/00 | (2006.01) | |
| G06F 11/30 | (2006.01) | |
| G06G 7/70 | (2006.01) | |
| F02M 37/04 | (2006.01) | |
| G01M 15/00 | (2006.01) | |
| G21C 17/00 | (2006.01) | |

(52) U.S. Cl. .................... 701/114; 123/506; 73/114.38; 702/185

(58) Field of Classification Search ................ 123/299, 123/295, 301, 90.11, 490, 568.16; 701/111, 701/114; 73/35.11, 114.38, 114.58, 114.74; 702/183, 185
See application file for complete search history.

(56) References Cited

U.S. PATENT DOCUMENTS

| | | | | |
|---|---|---|---|---|
| 3,835,829 A | * | 9/1974 | Links ........................... | 123/458 |
| 4,429,578 A | * | 2/1984 | Darrel et al. ................... | 73/659 |
| 4,554,834 A | * | 11/1985 | Prinz et al. ..................... | 73/597 |
| 5,008,841 A | * | 4/1991 | McElroy ....................... | 702/39 |
| 5,086,273 A | * | 2/1992 | Leon ...................... | 324/207.17 |
| 5,228,342 A | * | 7/1993 | McShane ...................... | 73/597 |
| 5,271,371 A | * | 12/1993 | Meints et al. ................ | 123/446 |
| 5,396,926 A | * | 3/1995 | Pataki et al. ............ | 137/596.17 |
| 5,404,301 A | * | 4/1995 | Slicker ......................... | 701/60 |
| 5,477,149 A | * | 12/1995 | Spencer et al. .............. | 324/418 |
| 5,524,484 A | * | 6/1996 | Sullivan ....................... | 73/168 |

(Continued)

FOREIGN PATENT DOCUMENTS

JP 63-012878 1/1988

(Continued)

OTHER PUBLICATIONS

Japanese Office Action dated Oct. 27, 2009, issued in corresponding Japanese Application No. 2005-334777, with English translation.

Primary Examiner—Stephen K Cronin
Assistant Examiner—Sizo B Vilakazi
(74) Attorney, Agent, or Firm—Nixon & Vanderhye PC

(57) ABSTRACT

A solenoid valve includes cyclically energizing and deenergizing a solenoid of the solenoid valve to repeatedly fully open and fully close the solenoid valve. When the energizing and deenergizing causes collisions of a moving member of the solenoid valve against at least one of a first and a second seat formed in a housing of the solenoid valve, noises are thus generated by the collisions and occurrence intervals of the noises are detected. Whether the solenoid valve is in normal or abnormal condition is diagnosed based on the detected occurrence intervals of the noises.

13 Claims, 7 Drawing Sheets

U.S. PATENT DOCUMENTS

| | | | |
|---|---|---|---|
| 5,738,071 A * | 4/1998 | Smith et al. | 123/357 |
| 5,832,157 A * | 11/1998 | Berthold et al. | 385/51 |
| 6,027,037 A * | 2/2000 | Murakami et al. | 239/88 |
| 6,116,209 A * | 9/2000 | Christ et al. | 123/299 |
| 6,170,465 B1 * | 1/2001 | Shomura | 123/436 |
| 6,196,184 B1 * | 3/2001 | Przymusinski et al. | 123/299 |
| 6,360,773 B1 * | 3/2002 | Rhodes | 137/554 |
| 6,530,277 B2 * | 3/2003 | Kumpfmueller | 73/592 |
| 6,557,779 B2 * | 5/2003 | Perr et al. | 239/96 |
| 6,726,459 B1 * | 4/2004 | Gottemoller et al. | 417/470 |
| 7,059,191 B2 * | 6/2006 | Gupta | 73/587 |
| 7,318,350 B2 * | 1/2008 | Boken | 73/587 |
| 7,497,206 B2 * | 3/2009 | Kemmer | 123/490 |
| 2001/0028005 A1 * | 10/2001 | Nagai et al. | 239/585.1 |
| 2003/0062030 A1 * | 4/2003 | Oashi | 123/496 |
| 2004/0055562 A1 * | 3/2004 | Stewart et al. | 123/299 |
| 2005/0274358 A1 * | 12/2005 | Kohira et al. | 123/406.22 |

FOREIGN PATENT DOCUMENTS

| | | |
|---|---|---|
| JP | 63-150463 | 6/1988 |
| JP | 10-318027 | 12/1998 |
| JP | 2003-106241 | 4/2003 |
| JP | 2004-225630 | 8/2004 |

* cited by examiner (FULL-OPEN)

(FULL-CLOSE)

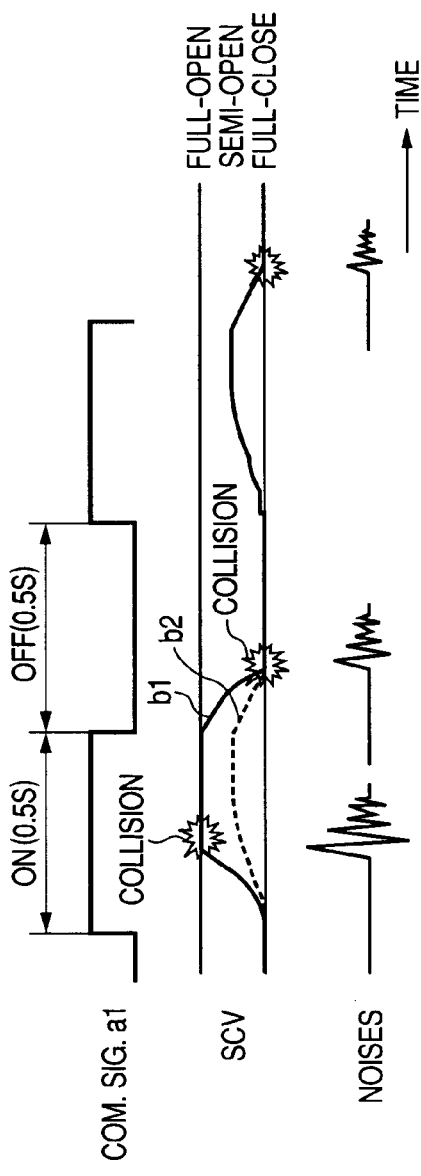
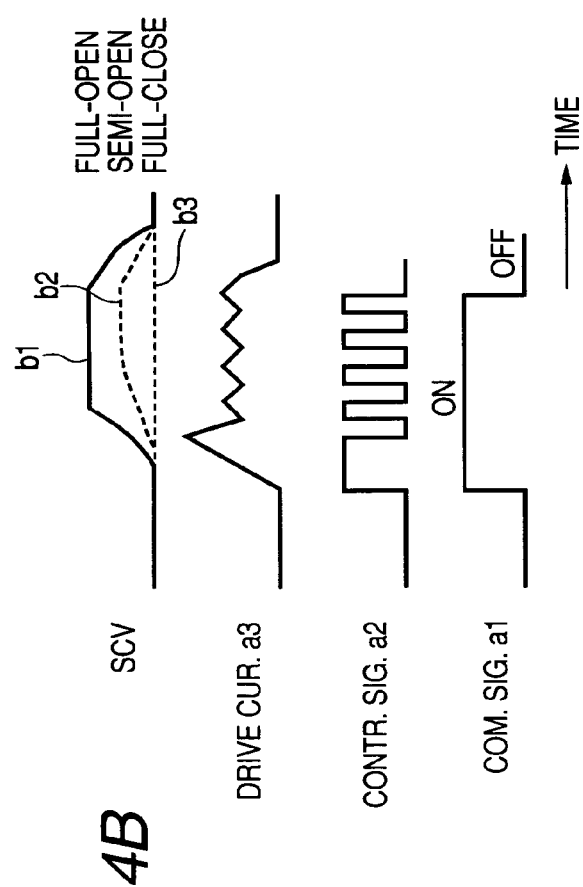
FIG. 4A
FIG. 4B

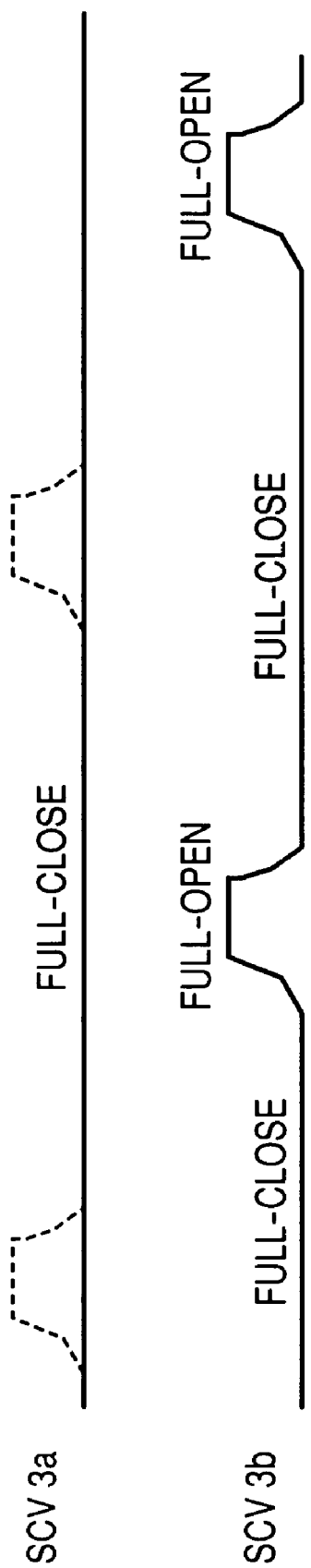

DIAGNOSIS METHOD FOR SOLENOID VALVE BASED ON NOISE DETECTION

CROSS-REFERENCE TO RELATED APPLICATION

This application is based on and claims priority from Japanese Patent Application No. 2005-334777, filed on Nov. 18, 2005, the content of which is hereby incorporated by reference into this application.

BACKGROUND OF THE INVENTION

1. Technical Field of the Invention

The present invention relates generally to diagnosis methods for solenoid valves and common rail fuel injection systems for diesel engines. More particularly, the invention relates to a method of diagnosing a solenoid valve employed in a common rail fuel injection system for a diesel engine.

2. Description of the Related Art

There is known a diagnostic apparatus for diagnosing a plurality of solenoid-type Suction Control Valves (SCVs) that are employed in a fuel supply unit of a common rail fuel injection system for a diesel engine to control an amount of pressurized fuel supplied from the fuel supply unit to a common rail of the system.

The diagnostic apparatus is configured to electrically diagnose the SCVs. More specifically, the diagnostic apparatus detects the presence of drive current in each of the SCVs and diagnoses whether the SCV is in normal or abnormal condition based on the detection results.

Accordingly, the diagnostic apparatus is only capable of detecting electrical failures or abnormalities, such as disconnection within each of the SCVs, disconnection within an EDU (Electronic Drive Unit) for driving the SCVs, and disconnection between each of the SCVs and the EDU.

However, even without electrical failures, the SCVs still cannot normally operate when there exist mechanical failures or abnormalities in the SCVs. For example, when foreign matters flow into the SCVs along with fuel, they may cause the SCVs to be locked, thus making it impossible to suitably control the amount of pressurized fuel supplied from the fuel supply unit to the common rail.

By way of example, suppose that the fuel supply unit includes two alternately-activated SCVs, each of which is mounted to a high-pressure pump of the fuel supply unit to control the amount of fuel sucked into the pump.

Then, when one of the SCVs is mechanically locked, the locked condition may not be easily perceived in low-flow conditions because there is the other SCV normally operating. On the other hand, in high-flow conditions, such as full acceleration, high-speed running, and hill climbing, the locked condition will cause shortage of the pressurized fuel. Thus, it is possible to detect the locked condition of the SCV by running the engine under a high-flow condition.

However, in a service shop, it is generally difficult to run the engine under a high-flow condition and it is thus difficult to diagnose the SCVs.

Further, even if it is possible to run the engine under a high-flow condition, it is still difficult for a diagnostician to accurately identify the locked SCV relying only on feeling and a diagnosis of fuel leakage.

Furthermore, in some cases, running the engine under a high-flow condition may temporary recover the locked SCV to normal and thus no any additional measure is taken. However, in other flow conditions, the SCV may be easily locked again, thus significantly impairing the drivability of a vehicle that employs the common rail fuel injection system.

SUMMARY OF THE INVENTION

The present invention has been made in view of the above-mentioned problems.

It is, therefore, a primary object of the present invention to provide a diagnosis method for easily and reliably diagnosing a solenoid valve.

According to the present invention, there is provided a diagnosis method for a solenoid valve.

The solenoid valve includes a housing with a first and a second seat formed therein, a moving member configured to be moved in the housing, and a solenoid. The solenoid valve is configured to fully open with the moving member resting on the first seat when the solenoid is energized and fully close with the moving member resting on the second seat when the solenoid is deenergized.

The diagnosis method includes:

energizing and deenergizing cyclically the solenoid of the solenoid valve to repeatedly fully open and fully close the solenoid valve;

when the energizing and deenergizing causes collisions of the moving member against at least one of the first and second seats in the solenoid valve and noises are thus generated by the collisions, detecting occurrence intervals of the noises; and diagnosing whether the solenoid valve is in normal or abnormal condition based on the detected occurrence intervals of the noises.

Using the above method, it is possible to easily and reliably diagnose whether the solenoid valve is in normal or abnormal condition without running the engine for which the solenoid valve serves.

Thus, it is possible to perform diagnosis on the solenoid valve in a service shop without generating noises which otherwise would be generated due to running of the engine.

According to a further implementation of the diagnosis method, when each cycle of the energizing and deenergizing causes two of the noises, the solenoid valve is diagnosed as being in normal condition; when each cycle of the energizing and deenergizing causes only one of the noises, the solenoid valve is diagnosed as being in semi-locked condition; and when there is no noise caused by the energizing and deenergizing, the solenoid valve is diagnosed as being in fully-locked condition.

Consequently, it becomes possible to accurately determine which one of normal, semi-locked, and fully-locked conditions the solenoid valve is in.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings:

FIGS. 4A and 4B are time charts illustrating operation of the solenoid valve;

FIG. 7 is a time chart illustrating another process of diagnosing two solenoid valves using the diagnosis method according to the invention.

DESCRIPTION OF THE PREFERRED EMBODIMENT

The preferred embodiment of the present invention will be described hereinafter with reference to FIGS. 1-6.

Figure 1:
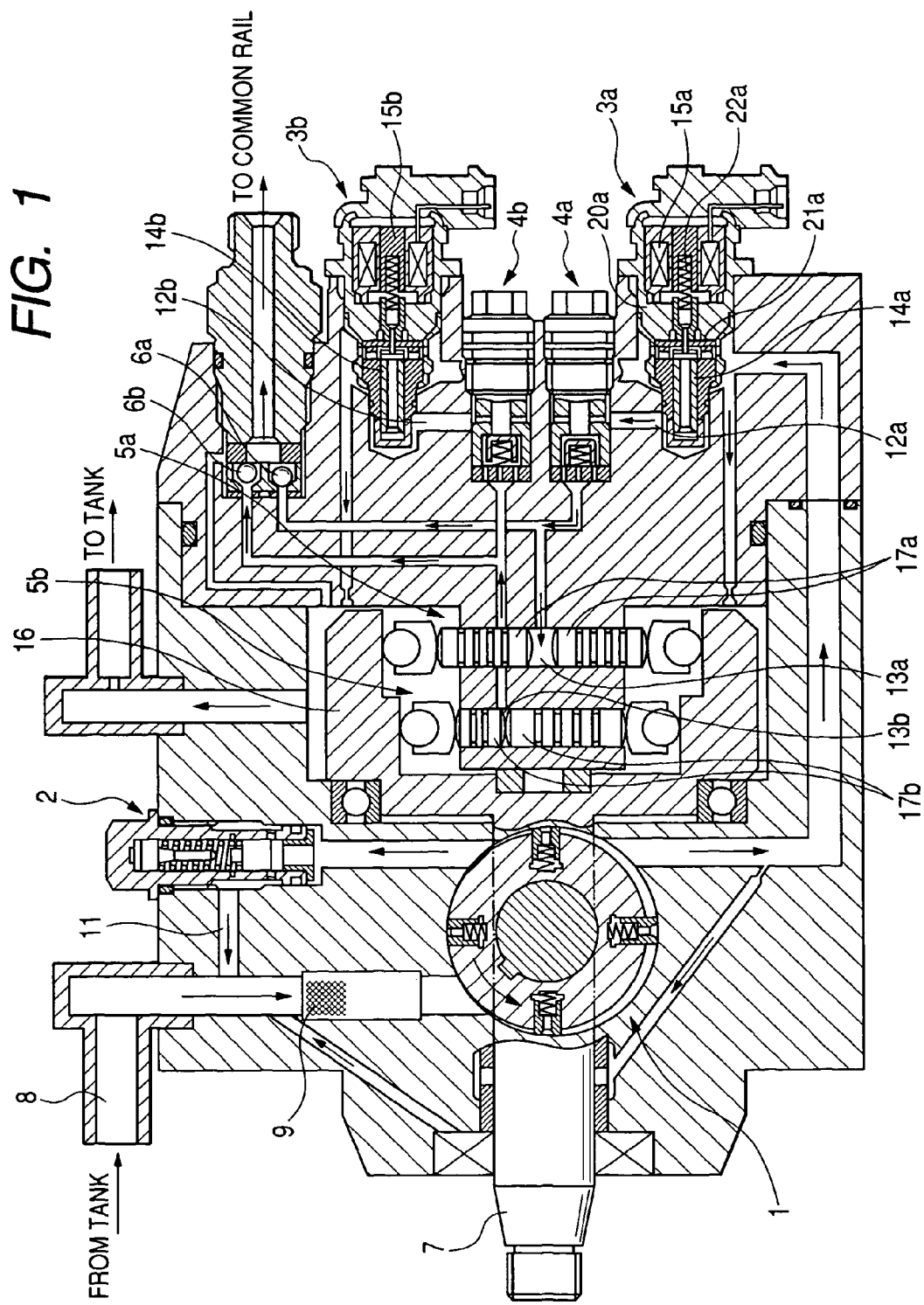
FIG. 1 is a partially cross-sectional view showing the overall structure of a fuel supply unit according to an embodiment of the invention.

FIG. 1 shows the overall structure of a fuel supply unit 100 according to an embodiment of the invention.

The fuel supply unit 100 is designed for use in a common rail fuel injection system for a diesel engine. In addition to the fuel supply unit 100, the common rail fuel injection system further includes a common rail, a pressure regulating valve, a plurality of fuel injectors, and a control apparatus, all of which are not shown in the figures. The fuel supply unit 100 works to pressurize fuel from a fuel tank (not shown) to a high pressure and provide the resultant high-pressure fuel to the common rail. The common rail is provided to accumulate therein the high-pressure fuel. The pressure reducing valve is of solenoid-type and mounted to the common rail to regulate fuel pressure in the common rail. Each of the fuel injectors woks to inject the high-pressure fuel accumulated in the common rail into one of cylinders of the engine. The control apparatus works to control operation of the fuel supply unit 100 and the fuel injectors.

As shown in FIG. 1, the fuel supply unit 100 includes a feed pump 1, which is shown in the figure in a state being rotated by 90° with respect to other members, a regulator valve 2, and a first and a second fuel pressurizing and supplying mechanism.

The first fuel pressurizing and supplying mechanism is composed of a solenoid-type SCV 3a, a suction valve 4a, a high-pressure pump 5a, and a discharge valve 6a. On the other hand, the second fuel pressurizing and supplying mechanism is composed of a solenoid-type SCV 3b, a suction valve 4b, a high-pressure pump 5b, and a discharge valve 6b. The first and second fuel pressuring and supplying mechanisms are configured to alternately pressurize and supply to the common rail the fuel fed from the feed pump 1.

The feed pump 1 works to draw fuel from the fuel tank and feed the drawn fuel to the high-pressure pumps 5a and 5b. In the present embodiment, the feed pump 1 is configured with a low-pressure vane pump, which is driven by a camshaft 7. In addition, the camshaft 7 is driven by a crankshaft of the engine.

During operation of the feed pump 1, the fuel from the fuel tank is sucked in via a fuel inlet 8 and a filter 9 and discharged via the SCVs 3a and 3b and suction valves 4a and 4b to the high-pressure pumps 5a and 5b.

The regulator valve 2 is provided in a fuel passage 11 that hydraulically connects the suction and discharge sides of the feed pump 1. The regulator valve 2 works to regulate the discharge pressure of the feed pump 1 to a predetermined feed pressure.

The SCV 3a is provided in a fuel passage 12a that leads fuel from the feed pump 1 to the high-pressure pump 5a. The SCV 3a works to control the amount of fuel sucked into a pressure chamber 13a of the high-pressure pump 5a, thereby controlling the discharge rate of the high-pressure pump 5a. Similarly, the SCV 3b is provided in a fuel passage 12b that leads fuel from the feed pump 1 to the high-pressure pump 5b. The SCV 3b works to control the amount of fuel sucked into a pressure chamber 13b of the high-pressure pump 5b, thereby controlling the discharge rate of the high-pressure pump 5b. The structure of the SCVs 3a and 3b will be described in detail latter.

The high-pressure pumps 5a and 5b are plunger pumps of opposed-stroke type. The high-pressure pumps 5a and 5b are configured to alternately pressurize the fuel fed from the feed pump 1 and supply the resultant high-pressure fuel to the common rail.

Specifically, the high-pressure pump 5a is made up of a cam 16 and a pair of plungers 17a. The cam 16 is substantially cylindrical in shape and driven by the camshaft 7. The cam 16 has a cam surface formed on an inner periphery thereof. Along the cam surface, the inner diameter of the cam 16 continuously changes in the circumferential direction, thereby defining strokes of the plungers 17a that are disposed inside the cam 16 and urged by the cam surface in the radial direction.

More specifically, the plungers 17a are arranged within the cam 16 such that they face each other in the radical direction of the cam 16 through the pressure chamber 13a formed therebetween.

Furthermore, in the present embodiment, the cam surface of the cam 16 is so formed that the plungers 17a reciprocate twice in the radial direction with one revolution of the cam 16, the cam 16 is configured to complete one revolution with two revolutions of the camshaft 7. Thus, the plungers 17a reciprocate once in the radial direction with one revolution of the camshaft 7.

With reciprocation of the plungers 17a, the fuel from the SCV 3a is sucked into the pressure chamber 13a, pressurized therein, and discharged from the pressure chamber 13a to the common rail.

Similarly, the high-pressure pump 5b is made up of the cam 16 and a pair of plungers 17b. The plungers 17b are arranged within the cam 16 so as to face each other in the radial direction of the cam 16 through the pressure chamber 13b formed therebetween. As the plungers 17a, the plungers 17b reciprocate once in the radial direction of the cam 16 with one revolution of the camshaft 7.

With reciprocation of the plungers 17b, the fuel from the SCV 3b is sucked into the pressure chamber 13b, pressurized therein, and discharged from the pressure chamber 13b to the common rail.

The suction valve 4a is a check valve which is provided between the SCV 3a and the high-pressure pump 5a to prevent reverse fuel flow from the high-pressure pump 5a to the SCV 3a. Similarly, the suction valve 4b is a check valve which is provided between the SCV 3b and the high-pressure pump 5b to prevent reverse fuel flow from the high-pressure pump 5b to the SCV 3b.

The discharge valve 4a is a check valve which is provided between the high-pressure pump 5a and the common rail to prevent reverse fuel flow from the common rail to the high-pressure pump 5a. Similarly, the discharge valve 4b is a check valve which is provided between the high-pressure pump 5b and the common rail to prevent reverse fuel from the common rail to the high-pressure pump 5.

Figure 2A:
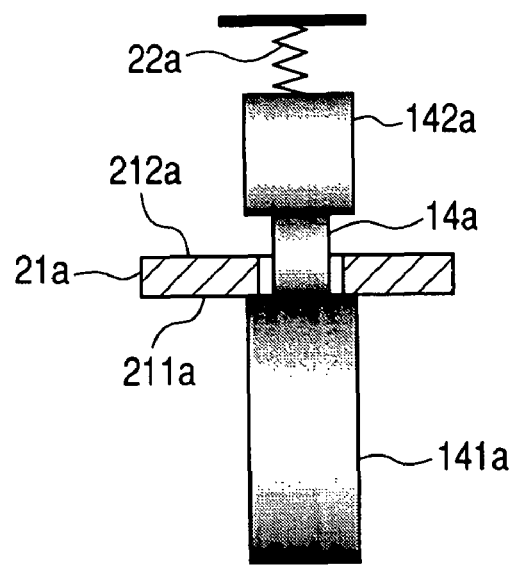
FIGS. 2A and 2B are schematic views respectively illustrating the full-open and full-closed conditions of a solenoid valve used in the fuel supply unit.
Figure 2B:
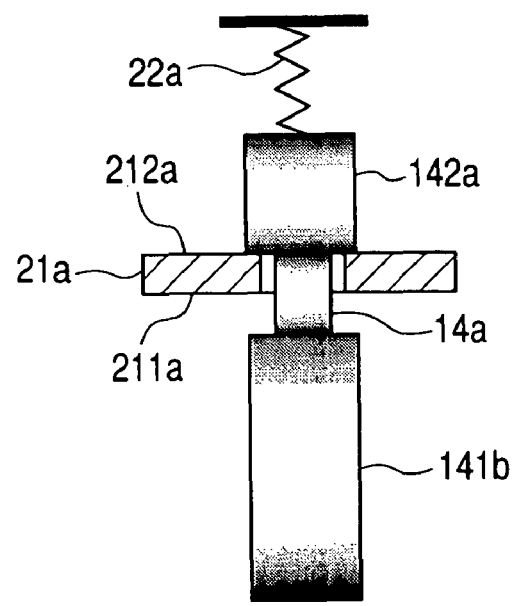

Referring now to FIGS. 1 and 2A-2B, the detailed structure of the SCV 3a will be described As to the structure of the SCV 3b, it is the same as the structure of the SCV 3a and thus the description thereof is omitted here.

The SCV 3a includes, as shown in FIG. 1, a valve member 14a, a solenoid 15a, a housing 20a, a seat plate 21a, and a return spring 22a.

The valve member 14a is slidably accommodated in the housing 20a and extends in the longitudinal direction of the SCV 3a through a center bore of the seat plate 21a. As shown in FIGS. 2A and 2B, the valve member 14a includes a lower portion 141a located below the seat plate 21a and an upper portion 142a located above the seat plate 21a.

The seat plate 2 la is fixed in the housing 20a. As shown in FIGS. 2A and 2B, the seat plate 21a has a lower surface, which serves as a first seat 211a for the valve member 14a, and an upper surface that serves as a second seat 212a for the valve member 14a.

The solenoid 15a is arranged in the housing 20a and creates an electromagnetic force when energized.

The electromagnetic force attracts the valve member 14a to move upward against the return spring 22a, until the lower portion 141a of the valve member 14 collides against and rests on the first seat 211a as shown in FIG. 2A. As a result, the SCV 3a is fully opened.

The return spring 22a is provided within the solenoid 15a and above the valve member 14a.

When the solenoid 15a is deenergized, the return spring 22a urges the valve member 14a to move downward, until the upper portion 142a of the valve member 14a collides against and rests on the second seat 212a as shown in FIG. 2B. As a result, the SCV 3a is fully closed.

After having described the overall structure of the fuel supply unit 100, operation thereof will be described hereinafter.

When the cam 16 rotates with rotation of the camshaft 7, the plungers 17a of the high-pressure pump 5a and the plungers 17b of the high-pressure pump 5b reciprocate with a difference of 180° in phase therebetween, thereby alternately discharging the high-pressure fuel to the common rail.

Figure 3:
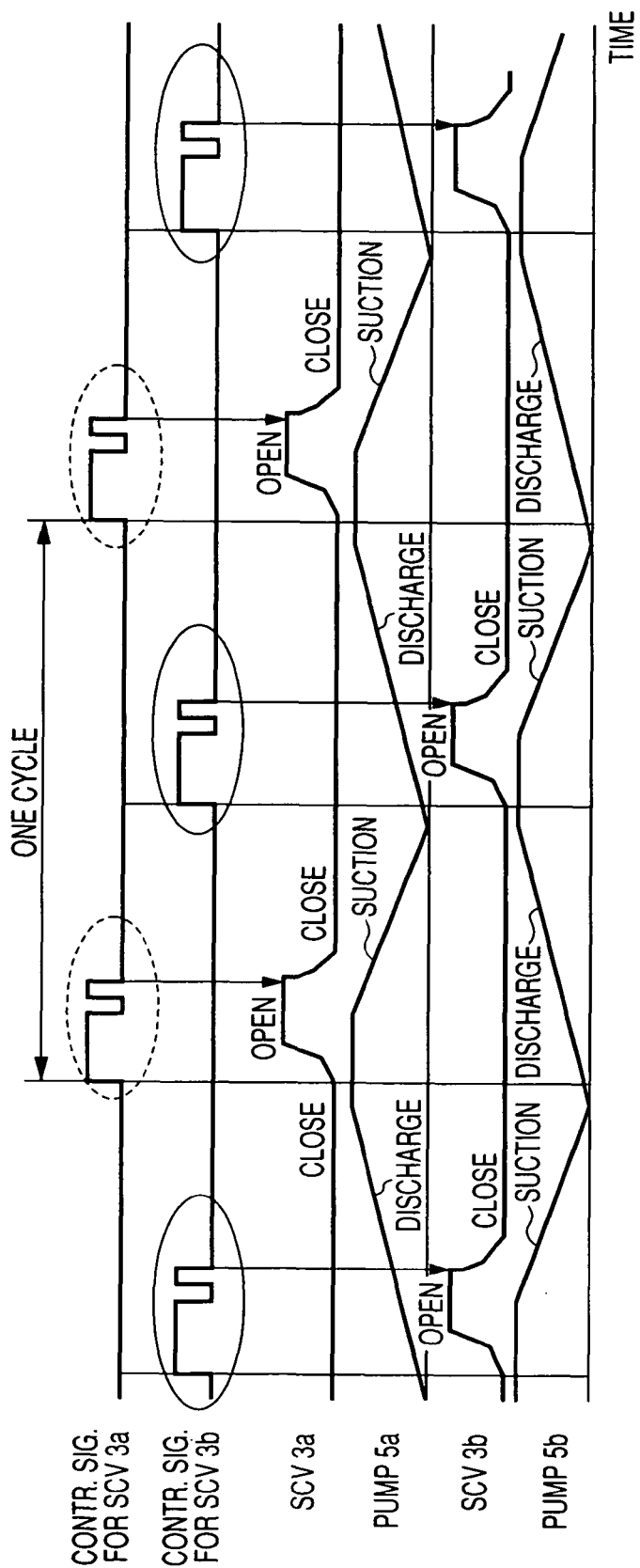
FIG. 3 is a time chart illustrating operation of the fuel supply unit.

Specifically, referring to FIG. 3, in suction stroke of the high-pressure pump 5a, drive current is supplied by the control apparatus to the SCV 3a for a first time period, so that the SCV 3a opens for a second time period that depends on the first time period. Then, the fuel from the feed pump 1 is sucked into the pressure chamber 13a of the high-pressure pump 5a, thus causing the two plungers 17a to move away from each other in the radial direction of the cam 16.

In discharge stroke of the high-pressure pump 5a, the fuel pressure in the pressure chamber 13a increases, thus closing the suction valve 4a. Then, when the fuel pressure in the pressure chamber 13a further increases to exceed a predetermined pressure, the discharge valve 6a opens, thus discharging the high-pressure fuel pressurized in the pressure chamber 13a to the common rail.

The high-pressure pump 5b operates in the same way as the high-pressure pump 5a. However, as mentioned above, the suction and discharge strokes of the high-pressure pump 5b lag those of the high-pressure pump 5a by 180°. More specifically, the high-pressure pump 5b starts the suction stroke when the high-pressure pump 5a starts the discharge stroke and starts the discharge stroke when the high-pressure pump 5b starts the suction stroke.

In the present embodiment, the control apparatus is composed of an Electronic Control Unit (ECU) and an Electronic Drive Unit (EDU).

The ECU includes a CPU, a ROM, a RAM, and I/O devices. The ECU is configured to perform various controls in accordance with a program installed in the ROM.

For example, the ECU works to generate a SCV control signal (i.e., a duty signal for control of the SCVs 3a and 3b) based on sensing signals received from various sensors and provide the SCV control signal to the EDU.

The sensors may include, for example, an accelerator position sensor for sensing accelerator position, a rotational speed sensor for sensing rotational speed of the engine, a water temperature sensor for sensing temperature of cooling water for the engine, an air temperature sensor for sensing temperature of intake air for the engine, and a fuel pressure sensor for sensing the fuel pressure in the common rail.

The EDU works to drive various devices, such as the injectors and the SCVs 3a and 3b, in accordance with control signals provided from the ECU.

For example, the EDU works to supply the drive current to the SCVs 3a and 3b in response to receipt of the SCV control signal from the ECU.

In the present embodiment, the ECU is also configured to electrically diagnose the SCVs 3a and 3b.

More specifically, the ECU works to detect presence of the drive current in the SCVs 3a and 3b and diagnose whether there are electrical failures based on the detection results. The electrical failures may include, for example, disconnection within the SCVs 3a and 3b, disconnection within the EDU, and disconnection between the SCVs 3a and 3b and the EDU.

However, when the SCVs 3a and 3b are in mechanically locked condition, this cannot be detected by the ECU. In other words, the ECU does not have a capability of diagnosing whether the SCVs 3a and 3b are in mechanically locked condition.

Therefore, in the present embodiment, a diagnosis method is provided for easily and reliably diagnosing whether the SCVs 3a and 3b are in mechanically locked condition.

According to the method, the engine is first stopped for diagnosis of the SCVs 3a and 3b.

Then, an auxiliary device (not shown) is connected to the ECU. The auxiliary device has a function of selecting one of the SCVs 3a and 3b as a target SCV and performing diagnosis only on the target SCV.

More specifically, after selecting one of the SCVs 3a and 3b as the target SCV, the auxiliary device sends a command signal a1 to the ECU.

The command signal a1 is, as shown in FIG. 4A, a pulse train with the same on-time and off-time of, for example, 0.5 s. The on state of the command signal a1 indicates a command for the target SCV to fully open and the off state indicates to fully close.

In response to receipt of the command signal a1, the ECU generates a control signal a2 as shown in FIG. 4B and sends it to the EDU.

Then, the EDU supplies drive current a3 as shown in FIG. 4B to the target SCV in accordance with the SCV control signal a2 received from the ECU.

The supply of the drive current a3 to the target SCV will produce different results under different conditions of the target SCV.

1) Normal Condition

When the target SCV is in normal condition (i.e., unlocked condition), the supply of the drive current a3 to the solenoid of the target SCV causes the valve member to move to collide against and rest on the first seat, so that the target SCV is fully opened as indicated by a solid line b1 in FIG. 4B.

The collision of the valve member against the first seat generates a noise (i.e., hitting sound) as indicated by a solid line b1 in FIG. 4A.

Further, when the supply of the drive current a3 to the solenoid of the target SCV is stopped, the valve member is moved by the return spring to collide against and rest on the second seat, so that the target SCV is fully closed as indicated by the solid line b1 in FIG. 4B.

The collision of the valve member against the second seat also generates a noise as indicated by the solid line b1 in FIG. 4A.

Accordingly, as seen from FIG. 4A, when the target SCV is in normal condition, each cycle of the command signal (i.e., each cycle of energizing and deenergizing the solenoid of the target SCV) causes two noises.

2) Semi-Locked Condition

When the target SCV is in semi-locked condition, the supply of the drive current a3 to the solenoid of the target SCV causes the valve member to move to rest at a position between the first and second seats, so that the target SCV is semi-opened as indicated by a dashed line b2 in FIG. 4B.

As a result, there is no collision and thus noise caused by the supply of the drive current a3 to the solenoid of the target SCV, as indicated by a dashed line b2 in FIG. 4A.

On the contrary, when the supply of the drive current a3 to the solenoid of the target SCV is stopped, the valve member is moved by the return spring to collide against and rest on the second seat, so that the target SCV is fully closed as indicated by the dashed line b2 in FIG. 4B.

The collision of the valve member against the second seat generates a noise as indicated by the dashed line b2 in FIG. 4A.

Accordingly, as seen from FIG. 4A, when the target SCV is in semi-locked condition, each cycle of the command signal (i.e., each cycle of energizing and deenergizing the solenoid of the target SCV) causes only one noise.

3) Fully-Locked Condition

When the target SCV is in fully-locked condition, the supply of the drive current a3 to the solenoid of the target SCV cannot cause any change in position of the valve member. In other words, the valve member rests on the second seat all the time, so that the target SCV is fully closed all the time as indicated by a dashed line b3 in FIG. 4B.

Accordingly, when the target SCV is in fully-locked condition, there is no noise caused by the command signal (i.e., by cyclically energizing and deenergizing the solenoid of the target SCV).

In view of the above, in the present embodiment, diagnosis is performed on the target SCV by relying on the acoustic sense of a diagnostician.

More specifically, after selecting the target SCV and sending the command signal to the ECU, the diagnostician detects, by hearing, whether there are noises generated from the target SCV.

If there are no noises generated, then the target SCV is diagnosed as being in fully-locked condition.

On the contrary, if there are noises generated from the target SCV, then the diagnostician further detects, by hearing, occurrence intervals of the noises.

If the occurrence intervals of the noises are equal to 0.5 s (i.e., each cycle of the command signal causes two noises), then the target SCV is diagnosed as being in normal condition.

Otherwise, if the occurrence intervals of the noises are equal to 1 s (i.e., each cycle of the command signal causes only one noise), then the target SCV is diagnosed as being in semi-locked condition.

As a result, the target SCV can be accurately diagnosed as being in one of normal, semi-locked, and fully-locked conditions without running the engine.

In the present embodiment, the auxiliary device further has a function of recovering the target SCV to normal when it is diagnosed as being in abnormal condition.

More specifically, when the target SCV is diagnosed as being in abnormal condition, the auxiliary device further sends a recovery command signal (not shown) to the ECU.

In response to receipt of the recovery command signal, the ECU sends to the EDU a control signal a2' which has a greater duty cycle (i.e., the ratio of on-time to off-time) than the control signal a2 used for diagnosis.

Figure 5:
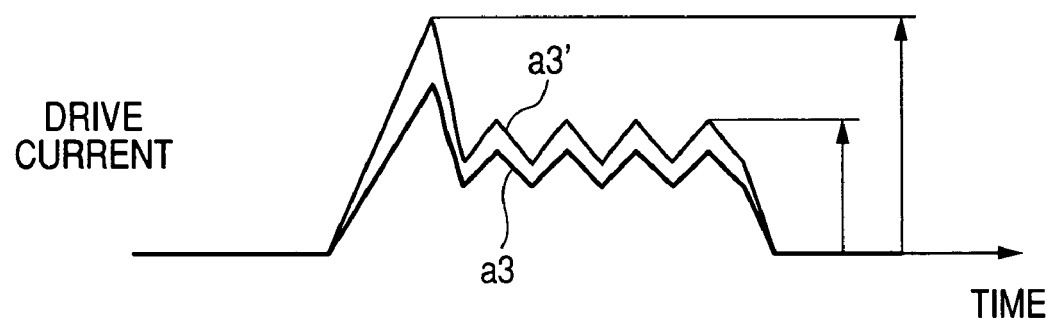
FIG. 5 is a time chart illustrating drive current supplied for recovery of the solenoid valve when it is in abnormal condition.

In response to receipt of the control signal a2', the EDU supplies drive current a3' which is stronger than the drive current a3 supplied for diagnosis, as shown in FIG. 5.

With the increase in the drive current, the magnetic attraction of the solenoid for the valve member is increased. Consequently, in some cases, the valve member can be released from semi-locked or fully-locked condition with the increased magnetic attraction.

Figure 6:
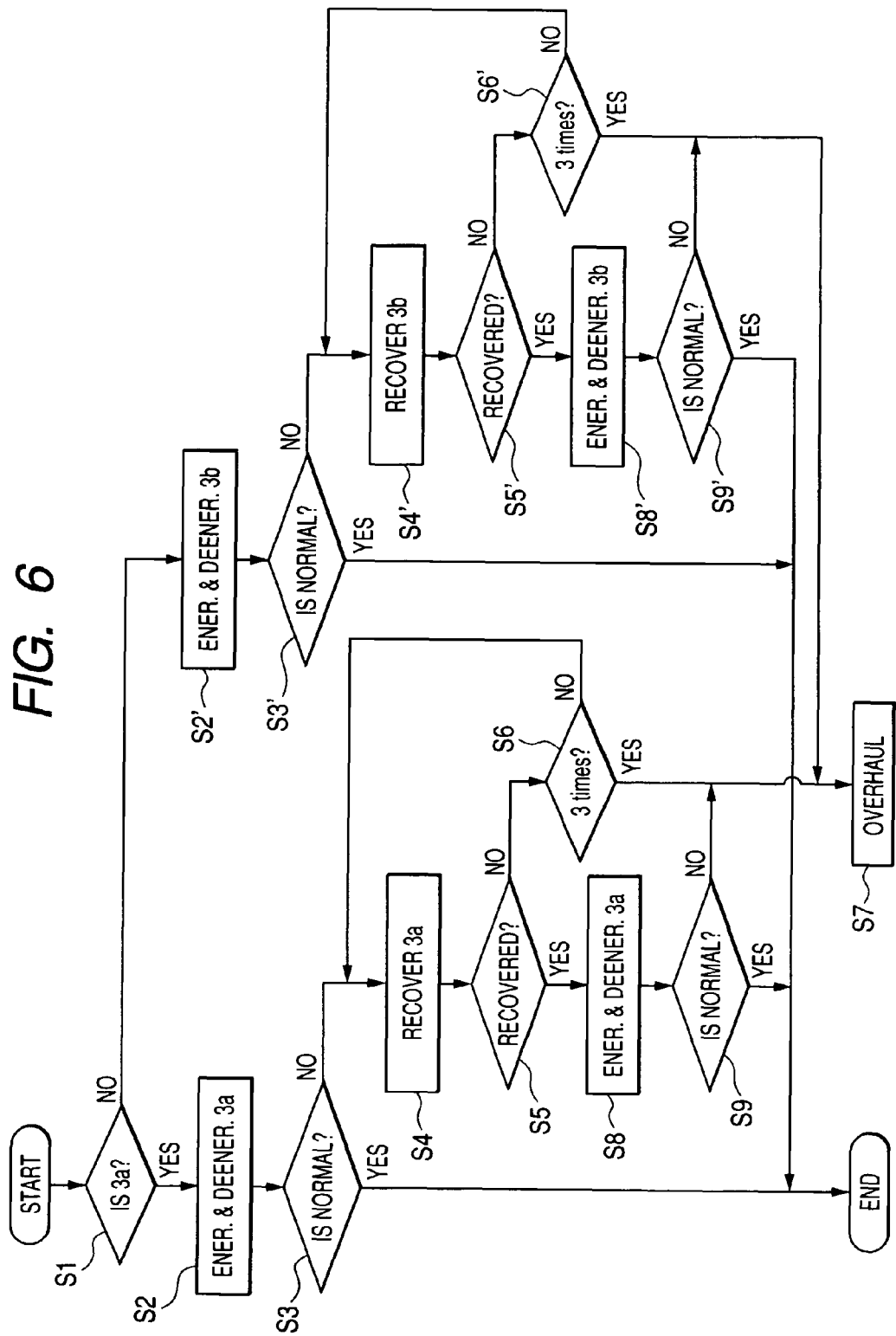
FIG. 6 is a flow chart illustrating a process of diagnosing two solenoid valves using a diagnosis method according to the invention.

FIG. 6 shows a process of diagnosing the SCVs 3a and 3b of the fuel supply unit 100 according to the above-described diagnosis method.

First, at the step S1, one of the SCVs 3a and 3b is selected as the target SCV.

If the SCV 3a is selected as the target SCV, then the process proceeds to the step S2.

Otherwise, if the SCV 3b is selected as the target SCV, then the process goes on to the step S2'.

At the step S2, the SCV 3a is cyclically energized and deenergized (abbreviated to ENER. & DEENER. in FIG. 6) for a predetermined time, for example, of 5 minutes.

More specifically, the ECU receives the command signal a1 from the auxiliary device and sends the control signal a2 to the EDU; the EDU supplies the drive current a3 to the SCV 3a according to the control signal a2.

At the step S3, diagnosis is performed on the SCV 3a by detecting noises from the SCV 3a.

If the SCV 3a is diagnosed as being in normal condition, then the process directly goes to the end.

Otherwise, if the SCV 3a is diagnosed as being in abnormal condition, then the process proceeds to the step S4.

At the step S4, recovery is performed for the SCV 3a.

More specifically, the EDU supplies the drive current a3', which is stronger than the drive current a3, to the SCV 3a for a predetermined time, for example, of 5 minutes.

At the step S5, a determination is made as to whether the SCV 3a is recovered to normal by detecting noises from the SCV 3a.

If the determination at the step S5 produces a "YES" answer, then the process proceeds to the step S8.

Otherwise, if the determination at the step S5 produces a "NO" answer, the process goes on to the step S6.

At the step S6, a further determination is made as to whether the recovery is performed on the SCV 3a, for example, three times.

If the determination at the step S6 produces a "YES" answer, then the process proceeds to the step S7, at which the SCV 3a is arranged to be overhauled or replaced with new one.

Otherwise, if the determination at the step S6 produces a "NO" answer, then the process returns to the step S4.

On the other hand, at the step S8, the SCV 3a is cyclically energized and deenergized as at the step S2.

At the succeeding step S9, the SCV 3a is re-diagnosed by detecting noises therefrom.

If the SCV 3a is diagnosed as being in normal condition, then the process goes to the end.

Otherwise, if the SCV 3a is diagnosed as being in abnormal condition, then the process proceeds to the step S7.

With regard to the steps S2'-S9' for the SCV 3b, they are the same as the above-described steps S2-S9 for the SCV 3a, and thus the description thereof is omitted here.

To sum up, the diagnosis method according to the present embodiment includes the following steps:

cyclically energizing and deenergizing the solenoid of the target SCV to repeatedly full open and fully close the target SCV;

detecting whether there are noises generated from the target SCV;

if there are no noises generated from the target SCV, diagnosing the target SCV as being in fully-locked condition;

if there are noises generated from the target SCV, detecting occurrence intervals of the noises;

if each cycle of the energizing and deenergizing causes two noises, diagnosing the target SCV as being in normal condition (i.e., unlocked condition); and if each cycle of the energizing and deenergizing causes only one noise, diagnosing the target SCV as being in semi-locked condition.

Accordingly, using the above diagnosis method, it is possible to easily and reliably diagnose whether the target SCV is in normal or abnormal condition without running the engine.

Thus, it is possible to perform diagnosis on the SCVs 3a and 3b in a service shop without generating noises which otherwise would be generated due to running of the engine.

Moreover, using the above diagnosis method, it is possible to accurately determine which one of normal, semi-locked, and fully-locked conditions the target SCV is in.

The diagnosis method according to the present embodiment further includes the step of energizing, when the target SCV is diagnosed as being in abnormal condition, the target SCV with the drive current a3', which is stronger than the drive current a3 for diagnosis, to recover the target SCV.

Accordingly, using the above diagnosis method, in some cases, it is possible to easily recover the abnormal target SCV without performing overhaul or replacement.

The diagnosis method according to the present embodiment further includes the step of selecting one of the SCVs 3a and 3b as the target SCV.

Accordingly, using the above diagnosis method, it is possible to separately diagnose the SCVs 3a and 3b. Thus, when only one of the SCVs 3a and 3b is in abnormal condition, it is possible to identify the abnormal one.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the auxiliary device is configured to be connected to the ECU and cyclically energize and deenergize the target SCV through the ECU and the EDU.

As an alternative to the above, the auxiliary device may be configured to be directly connected to the target SCV and cyclically energize and deenergize the target SCV by itself.

In the previous embodiment, diagnosis is performed on the target SCV with the engine stopped.

However, the diagnosis may also be performed on the target SCV when the engine is running under, for example, idling condition. In this case, as shown in FIG. 7, only the target SCV (e.g., the SCV 3b) is activated to repeatedly fully open and fully close, while the non-target SCV (e.g., the SCV 3a) remains full-closed.

In the previous embodiment, the SCVs 3a and 3b are diagnosed by relying on the acoustic sense of a diagnostician when the engine is stopped.

As an alternative to the above, the ECU may be configured to diagnose the SCVs 3a and 3b by employing one or more pickup sensors for sensing noises generated from the SCVs 3a and 3b during running of the engine.

In the previous embodiment, the fuel supply unit 100 is configured to include two SCVs 3a and 3b to be diagnosed.

However, the fuel supply unit 100 may be configured to include only one or more than two SCVs to be diagnosed.

In the previous embodiment, the diagnosis method is used to diagnose the SCVs 3a and 3b of the fuel supply unit 100.

However, the diagnosis method may also be used to diagnose the pressure reducing valve which works to regulate the fuel pressure in the common rail.

Furthermore, the diagnosis method may also be used to diagnosis any other solenoid valves.

Such modifications, changes, and improvements are possible within the scope of the appended claims.

What is claimed is:

1. A diagnosis method for a solenoid valve, wherein the solenoid valve includes a housing with a first and a second seat formed therein, a moving member configured to be moved in the housing, and a solenoid, and wherein the solenoid valve is configured to fully open with the moving member resting on the first seat when the solenoid is energized and fully close with the moving member resting on the second seat when the solenoid is deenergized, the diagnosis method comprising:

cyclically energizing and deenergizing the solenoid of the solenoid valve to repeatedly fully open and fully close the solenoid valve;

when the energizing and deenergizing causes collisions of the moving member against at least one of the first and second seats in the solenoid valve and noises are thus generated by the collisions, detecting occurrence intervals of the noises; and diagnosing whether the solenoid valve is in normal or abnormal condition based on the detected occurrence intervals of the noises, wherein the solenoid valve is diagnosed:

as being in normal condition when each cycle of the energizing and deenergizing causes two noises;

as being in semi-locked condition when each cycle of the energizing and deenergizing causes only one noise; and as being in fully-locked condition when there is no noise caused by the energizing and deenergizing.

2. The diagnosis method as set forth in claim 1, further comprising:

when the solenoid valve is diagnosed as being in abnormal condition, energizing the solenoid of the solenoid valve with electric power stronger than that used for normally energizing the solenoid to thus attempt return of the solenoid valve to a normal condition.

3. The diagnosis method as set forth in claim 1, wherein the diagnosis method is for diagnosing a plurality of solenoid valves that are included in a fuel supply unit of a common rail fuel injection system for a diesel engine to control an amount of pressurized fuel supplied from the fuel supply unit to a common rail of the system; and the diagnosis method further comprises, before the step of energizing and deenergizing, selecting one of the plurality of solenoid valves in the fuel supply unit as a target valve to be exclusively diagnosed; and the target valve is diagnosed only when the engine is stopped.

4. The diagnosis method as set forth in claim 3, wherein the fuel supply unit includes a plurality of pumps working to pressurize fuel, and each of the solenoid valves is mounted to a corresponding one of the pumps to control an amount of fuel sucked into the corresponding pump.

5. The diagnosis method as set forth in claim 4, wherein the solenoid valves are alternately activated according to suction strokes of the respectively corresponding pumps.

6. The diagnosis method as set forth in claim 1, wherein the solenoid valve is a pressure reducing valve mounted to a common rail of a common rail fuel injection system for a diesel engine to regulate fuel pressure in the common rail.

7. A method for diagnosing the condition of a solenoid-controlled valve which, in use, is electrically driven to control fluid flow therethrough, said valve having a moving member which can move between first and second seated positions corresponding to fully-open and fully-closed valve operating positions, said method comprising:

driving said solenoid-controlled valve with an isolated electrical drive signal of predetermined frequency between its fully-open and fully-closed positions;

detecting expected acoustic noise occurrences normally generated when said moving member is caused to engage its seated positions; and diagnosing valve condition, as being (a) normal if the frequency of said acoustic noise occurrences is twice said predetermined frequency, (b) semi-locked if the frequency of said acoustic noise occurrences is equal to said predetermined frequency, and (c) locked if no acoustic noise occurrences are detected.

8. A method as in claim 7, wherein plural of said solenoid-controlled valves are present but only one is tested at any given time.

9. A method as in claim 7, wherein said solenoid-controlled valve is part of a pressurized fuel delivery system for a diesel engine, said valve being used to maintain a predetermined fuel pressure in a fuel injection system common rail supplying pressurized fuel for injection into each of plural diesel engine cylinders.

10. A method as in claim 9, wherein said diesel engine is not operating during the steps of driving, detecting and diagnosing.

11. A method as in claim 9, wherein plural of said solenoid-controlled valves are present and wherein said driving, detecting and diagnosing steps are automatically performed by a computer-implemented diagnostic system connected to drive only one solenoid-controlled valve at a time.

12. The diagnosis method as set forth in claim 1, wherein the solenoid valve is included in a fuel supply unit of a common rail fuel injection system for a diesel engine to control an amount of pressurized fuel supplied from the fuel supply unit to a common rail of the system, the engine is stopped during the steps of cyclically energizing and deenergizing, detecting and diagnosing, and the step of diagnosing is performed by relying on the acoustic sense of a diagnostician.

13. The diagnosis method as set forth in claim 6, wherein the engine is stopped during the steps of cyclically energizing and deenergizing, detecting and diagnosing, and the step of diagnosing is performed by relying on the acoustic sense of a diagnostician.

\* \* \* \* \*